United States Patent [19]

Wittstock

[11] Patent Number: 4,916,868
[45] Date of Patent: Apr. 17, 1990

[54] HONING, LAPPING OR POLISHING MACHINE

[75] Inventor: Gerhard Wittstock, Uetersen, Fed. Rep. of Germany

[73] Assignee: Peter Wolters AG, Fed. Rep. of Germany

[21] Appl. No.: 242,335

[22] Filed: Sep. 8, 1988

[30] Foreign Application Priority Data

Sep. 14, 1987 [DE] Fed. Rep. of Germany ....... 3730795

[51] Int. Cl.$^4$ ............................................... B24B 7/17
[52] U.S. Cl. ..................... 51/281 R; 51/118; 51/133; 51/165.74; 51/283 R
[58] Field of Search ...................... 51/118, 133, 165.74, 51/237 M, 281 R, 283 R

[56] References Cited

U.S. PATENT DOCUMENTS 4,593,495  6/1986  Kawakami et al. .................... 51/118

FOREIGN PATENT DOCUMENTS 3624878  7/1987  Fed. Rep. of Germany .
187447  10/1984  Japan ..................................... 51/118

Primary Examiner—Frederick R. Schmidt
Assistant Examiner—Jack W. Lavinder
Attorney, Agent, or Firm—Brown, Martin, Haller & McClain

[57] ABSTRACT

A honing, lapping or polishing machine includes a central inner gear member and an outer annular gear member each having an annular row of teeth, and a plurality of workpiece holder discs having teeth at their outer peripheries in driving engagement with the teeth on the inner and outer gear members in a planetary gear type fashion. The workpiece holder discs have recesses for receiving workpieces. The number of teeth on the outer gear member is an integral multiple of the number of teeth on each workpiece holder disc. A drive assembly rotates the inner gear member and is arranged to stop the workpiece holder discs in a predetermined loading and unloading position of at least one of the discs in response to a position signal from a detector assembly. The detector assembly includes a position detector movable into the path of the discs to provide the position signal when one of the discs reaches a predetermined relative position with respect to the position detector.

16 Claims, 1 Drawing Sheet

HONING, LAPPING OR POLISHING MACHINE

The present invention relates to a honing, lapping or polishing machine.

Such machines are used for surface finishing, e.g. of wafers for microchips or the like. The workpieces are held by workpiece-receiving discs provided with corresponding recesses for holding the workpieces. In many machines of this type the workpiece holder discs are designed as planatary gears in driving engagement with an annular outer gear member and an annular inner gear member in the work plane of upper and lower working discs. Generally, the centrally arranged inner gear member is driven, while outer gear member is held stationary. The workpiece holder discs are provided with toothings at their outer peripheries, while the inner and outer gear members include pins or teeth. German disclosure letter No. 36 24 878 discloses a machine wherein a plurality of workpiece holder discs arranged on a circle is driven by a pinion which is in driving engagement with a central gear wheel. A plurality of further pinions serving as bearing means is associated to the outer periphery of the workpiece holder discs Accordingly the workpiece holder discs are rotated about a fixed axis. A workpiece-receiving recess of the workpiece holder discs, however, is excentrically arranged so that it follows a circular path when the workpiece holder discs are rotated.

While the just-mentioned machine may be advantageous in many respects, it does have some drawbacks. So this known machine requires a plurality of bearing means. Since honing, lapping or polishing involves the use of an abrasive medium, the bearing means must be protected therefrom to prevent any damaging thereof.

In the known machine the number of teeth of the central gear wheel is an integral multiple of the numer of teeth of the workpiece holder discs. The shaft of the central pinion is associated with a plurality of cams which are counted during rotation of the shaft. If the workpiece holder discs are disposed in predetermined angular positions, the corresponding angular positions of the workpiece holder discs may be detected by means of said cams. This allows to determine the coordinates of the workpiece-receiving recesses in the workpiece holder discs. This information may be fed to a robot enabling it to remove the workpieces from the individual workpiece holder discs or to deposit new workpieces onto said workpiece holder discs. To this end the coordinates of the workpiece-receiving recesses must be known very precisely; otherwise the workpieces may be affected or even damaged in particular by the loading operation. A precise or accurate determination of the coordinates, however, is extremely difficult due to wear of the workpiece holder discs, in particular of their toothings. Also the other pinions or gear members are subjected to wear. As a result thereof there is a certain play of the workpiece holder discs with respect to their drive. A precise positioning of the workpiece holder discs for loading and unloading, accordingly, is hardly possible. Furthermore, the loading and unloading means must be aligned to each of the workpiece holder discs requiring a complicated and cumbersome loading device and a sophisticated control.

It is a primary object of the present invention to provide a honing, lapping or polishing machine adapted to load and unload workpieces into and from the workpiece holder discs by loading and unloading means in an extremely simple manner.

This object and other objects are fulfilled by a machine as defined in claim 1.

In the machine of the present invention the number of pins or teeth of the outer gear member is an integral multiple of the number of teeth of each of the workpiece holder discs. This feature ensures that each tooth of the workpiece holder discs follows the same path in a reproducible manner when the workpiece holder disc is orbited between the inner and outer gear members. In other words, a predetermined point or tooth of the workpiece holder disc will reach the same point with respect to a stationary point in each cycle. When a position detector is disposed adjacent the orbital path of the workpiece holder discs, a predetermined tooth of the workpiece holder discs e.g. comes closest to the position detector. If this position is detected by means of the position detector, it is possible to move the workpiece holder discs in each cycle into the same position and angular position by a stop signal provided to the drive motor. If the position detector responds to a predetermined point on the workpiece holder disc and if it detects e.g. when this signal generating point of the workpiece holder disc is closest to the detector and if a corresponding detector signal results in stoppage of the drive, the workpiece holder disc is always held stationary in the same position, in particular in the same angular position. This allows to move a workpiece loading and unloading device precisely into a predetermined position above the workpiece holder discs to load or unload workpieces, a special searching operation being unnecessary.

The position detector may be an inductive, capacitive, optoelectronic or mechanical position sensor and may cooperate with any part of the workpiece holder discs. Preferably, the position detector is arranged to cooperate with the head portions (tips) of the toothings of the workpiece holder discs since they are not subjected to wear in operation.

Depending on the type and use of the position detector a predetermined tooth of the toothings of the workpiece holder discs may be designed in a particular manner. It may be e.g. of a particular geometrical shape, may have a greater length than the others or may be provided with a corresponding recess so that it may be detected from a mechanical detector in a very simple manner. As an alternative it may be provided with a particular surface or an initiator adapted to influence a magnetic field. Workpiece holder discs generally are made from plastics. Accordingly, it would be feasible to have said one tooth containing a metal member responsive to the magnetic field of the position detector. Also with an optoelectronic detector said one tooth may be of a particular geometrical shape or may be particularly coloured to make it responsive to a lightsensing element or the like.

According to a further aspect of the present invention the position detector is connected to a positioning unit for moving the position detector from a retracted rest position into a sensing position, and vice versa. This allows to move the position detector temporarily very close to the outer periphery of the workpiece holder disc to obtain an accurate sensing operation. As soon as the sensing operation has been terminated, the position detector is moved into its rest position by the positioning unit so that during the next cycle it will be outside the orbital path of the workpiece holder discs and will not be damaged or contaminated.

Preferably, the number of teeth or pins of the inner and outer gear members is an integral multiple of the number of workpiece holder discs in the working plane. This allows to retain a constant spacing of the workpiece holder discs so that the coordinates and the angular positions of all workpiece holder discs may be determined by determining the corresponding data for one workpiece holder disc by means of the position sensor.

To allow for accurate sensing the drive motor may be operated in a slow motion mode, and the control circuit is adapted to activate the position sensor when the drive motor is operated in the slow motion mode, possibly after it has been stationary. Such slow motion also allows for precise braking of the drive.

According to a further aspect of the present invention a further position sensor is provided outside of the orbital path of the workpiece holder discs to provide an activating signal for the first mentioned position detector or the positioning unit when the workpiece holder disc is in a predetermined relative position with respect to said further position detector. Preferably, said further position sensor is upstream of said first mentioned position sensor and is arranged to detect e.g. engagement of the toothing of a workpiece holder disc and the teeth or pins of the outer gear member. Since at the position of the position sensor it is always the same teeth that come into engagement with the outer gear member, said further position detector allows a coarse position detection. The first mentioned position detector is activated after a detecting operation of said further position detector to determine the precise position of the workpiece holder disc and provides a stop signal to the drive motor in order to stop the workpiece holder disc in the predetermined position.

The first mentioned and/or further position sensor may be mounted in the work area in different ways. Preferably they are mounted to the outer gear member.

Also with the machine of the present invention a play between the central gear member and the toothings of the workpiece holder discs may result from wear. According to a further aspect of the present invention an aligning mechanism is disposed outside of the orbital path or the workpiece holder discs to align the workpiece holder discs in radial directions when they have reached their predetermined relative position. Preferably, the aligning mechanism cooperates with the outer periphery of the toothings of the workpiece holder discs. This ensures that the workpiece holder discs are moved into an accurate position in a reproducible manner when the drive as controlled by the position detector has terminated the orbiting operation, the outer peripheries of the workpiece holder discs not being subjected to wear.

As already mentioned, determination of the position of one workpiece holder disc allows to determine also the positions of the other workpiece holder discs due to a corresponding tooth number relationship. With respect to a workpiece loading and unloading device this means that its head has to be arranged two-dimensional displacements in a plane parallel to the plane of the working discs. A relatively complicated construction would be the result. According to a further aspect of the present invention it is more convenient to determine the positions of the various workpiece holder discs one after the other. Accordingly, they all will be moved into the same position which allows to move the head of the loading and unloading device linearly for performing its operation.

With the last mentioned method it might need some time to move the workpiece holder discs into the loading and unloading positions in order to load or unload workpieces onto and from the workpiece holder disc. As an alternative the positioning of the workpiece holder discs is performed at a time when the finished workpieces are deposited and the fresh workpieces are picked up from the loading device for loading. This may be achieved by moving the head of the loading and unloading device, after loading of a workpiece holder disc in the loading position, to an adjacent workpiece holder disc for removal of the workpieces thereof. If the head is provided with gripping and holding means working in planes, the relative position of the head and the positioning of the various workpiece-receiving recesses in the workpiece holder disc are nof no relevance. The picked-up workpieces will be deposited outside of the machine. Thereafter the head picks up the new workpieces and carries them to the previously unloaded workpiece holder disc which in the meantime has been moved on into the loading position. Such a method is relatively timesaving. With this method a head which is only linearly movable will suffice. Preferably, the direction of displacement of the head extends through the centers of a pair of adjacent workpiece holder discs of which at least one is disposed in the precise loading position. It goes without saying that in this method the workpiece holder discs are spaced from each other by a constant distance.

An embodiment of the invention will now be explained in detail with reference to the accompanying drawings.

Figure 1:
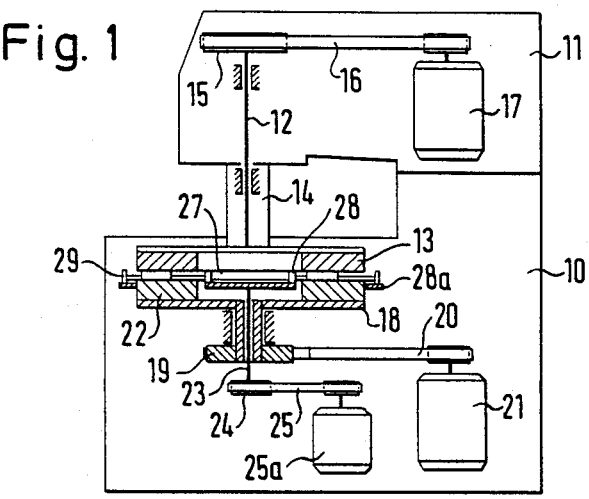
FIG. 1 shows, partly in section, a side elevational view of a honing machine in a very schematic manner.

The honing machine shown in FIG. 1 comprises a base frame 10 and an upper frame 11 which is supported on base frame 10 for pivotal movements about a vertical axis. A shaft 12 supported in upper frame 11 is arranged to drive an upper working disc 13. Working disc 13 is adjustable in height in the area 14 by a (not shown) mechanism. A pulley 15 is mounted to shaft 12 to be driven from a drive motor 17 by means of a belt 16.

A carrier disc 18 is rotatably mounted in base frame 10. Carrier disc 18 includes a hollow shaft provided with a drive pulley 19 which is driven by a drive motor 21 via a belt 20. A lower working disc 22 rests upon the carrier disc 18. A shaft 23 extends through the hollow shaft of the carrier disc 18. A drive pulley 24 is mounted to shaft 23 and is driven by a drive motor 25a by means of a belt 25. A central wheel 27 comprising an inner gear member 28 including a circular row of pins is mounted to shaft 23. A stationary ring member 28a supports an outer gear member 29 including a circular row of pins. The outer gear member 29 is adjustable in height relative to working disc 22.

Figure 2:
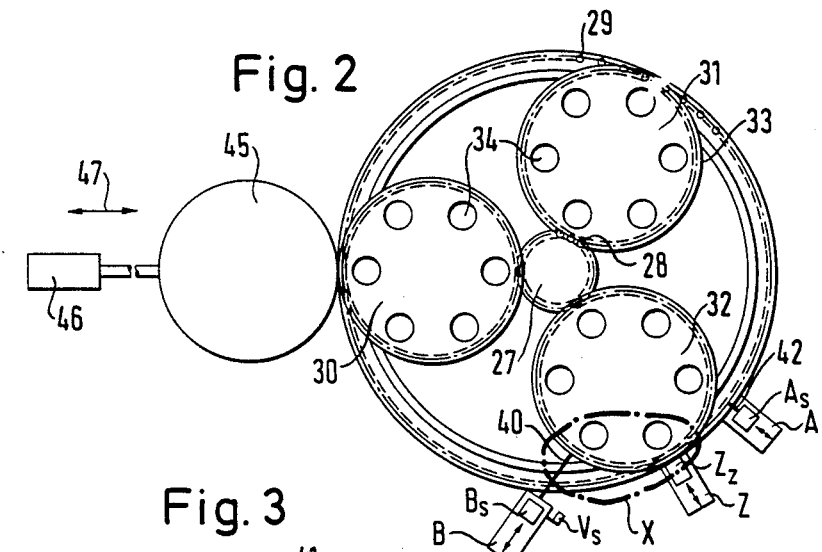
FIG. 2 shows a plan view of the lower working disc including workpiece holder discs and their drive in a schematic manner.
Figure 3:
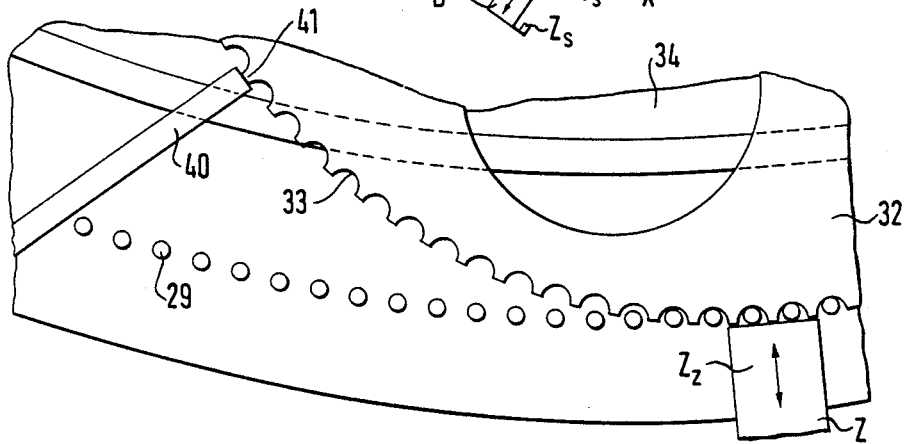
FIG. 3 shows the detail X of FIG. 2 in an enlarged scale.

As may be seen from FIG. 2, three workpiece holder discs 30, 31, 32 are arranged on the work side of the lower working disc 22. Workpiece holder discs 30, 31, 32 generally are made from plastics material or steel and each include a toothing 33 at the outer periphery. Toothing 33 is in driving engagement with gear member 29 and gear member 28 of central wheel 27. Workpiece holder discs 30, 31 and 32 include workpiece-receiving recesses 34 for receiving workpieces (not shown). The details described so far are features of conventional honing, lapping or polishing machines.

If central wheel 27 is driven, workpiece holder discs 30, 31, 32 are orbited along outer gear member 29 so as to be rotated about their own axes. Each of recesses 34 move along a cycloidal path.

The number of teeth of the outer gear member 29 is an integral multiple of the number of teeth of toothing 33. As a result thereof workpiece holder discs 30, 31, 32 will always be in the same angular position with respect to a stationary point. In other words, any tooth of workpiece holder disc 30, 31 and 32 will have the same relationship with respect to any pin of outer gear member 29 or, in still other words, any tooth of a workpiece holder disc will always engage between the same adjacent pins of outer gear member 29. If furthermore the number of the teeth of outer gear member 29 and inner gear member 28 is an integral multiple of the number of workpiece holder discs 30, 31, 32, it is possible to provide and retain constant spacings between the workpiece holder discs.

A position detector comprising a sensing probe is associated with the outer gear member 29 outside thereof. It is connected to a positioning unit B for displacement of the sensing probe between a retracted rest position and an extended sensing position as indicated by a double-arrow. The two positions are determined by limit switches $Z_s$ and $V_s$. In the positioning unit sensing probe 40 is connected to a switch $B_s$. Sensing probe 40 is responsive to tooth 41 of the toothing of disc 32 since it is only tooth 41 which will always be at the same point where the end of sensing probe 40 is positioned, in order to slightly displace the latter. Switch $B_s$ detects displacements of the sensing probe and provides a corresponding position signal to a control circuit (not shown) in order to deactivate drive motor 25a.

A positioning unit A is disposed in circumferentially spaced relationship with respect to the positioning unit B and includes a switch $A_s$ having a sensing probe 42. Switch $A_s$ is also displaceable in a radial direction as indicated by a double-arrow. Switch $A_s$ includes a sensing mechanism to detect when sensing probe 42 engages toothings 33 of discs 30, 31, 32.

An aligning device Z is disposed between positioning units B and A and includes an aligning element $Z_z$ which is displaceable in a radial direction relative to the axis of central wheel 27 as indicated by a double-arrow. Upon actuation aligning element $Z_z$ engages the head portions (tips) of the teeth of toothing 33.

FIG. 2 also shows, in a schematic manner, a loading and unloading device comprising a head 45 which is displaceable in the direction of double-arrow 47 by displacement means 46. When working disc 13 has been raised, head 45 may be moved across working disc 22 and may deposit workpieces into recesses 34 or remove workpieces therefrom. It goes without saying that head 45 operates in the same manner with respect to any of the other workpiece holder discs when they are in the position of disc 30. Furthermore, head 45 may also be moved into the position in which disc 30 is shown in FIG. 2. It should be noted that the loading and unloading device is in the shown position merely for illustratory purposes.

For a description of the operation of the machine as shown it is assumed that recesses 34 contain workpieces which have been surface-finished and are ready for removal. Drive motors 17, 21, 25a are deactivated, and the upper working disc 13 is raised and pivoted out of the way. This operation causes the control circuit (not shown) to provide a signal for the displacement means of the position unit A and the aligning device Z. Thereafter drive motor 25a is reactivated. This causes the workpiece holder discs 30, 31, 32 to be driven again. As a result thereof sensing probe 42 responds when disc 32 has reached a predetermined position. In FIG. 2 this operation has just been terminated. In response to the activating signal from sensing probe 42 the control circuit causes drive motor 25a to operate in the slow motion mode. Furthermore position unit B displaces sensing probe 40 into its sensing position. Limit switch $V_s$ detects when sensing probe 40 has reached the sensing position. Slowly moving workpiece holder disc 32 acts upon sensing probe 40. The output signal from switch $B_s$ leads to an immediate stop of drive motor 25a which is provided with effective braking means (not shown). When drive motor 25a has been deactivated, sensing probe 40 is reset into its rest position. This is detected by limit switch $Z_s$.

Activating aligning element $Z_z$ ensures that even with a substantial play in the toothing a precisely defined position of the workpiece holder disc in a radial direction may be maintained since aligning element $Z_z$ engages the outer periphery of the workpiece holder disc which is not subjected to wear. The unloading device, i.e. head 45 of the unloading device may now remove the workpieces from recesses 34 of disc 32. The positions of recesses 34 arranged along a circle are always the same for each determination of the position of disc 32 and the subsequent determination of the orbiting movement so that the corresponding gripping means in head 45 once they have been adjusted thereto are always aligned to recesses 34. This allows the loading and unloading device to be of an extremely simple structure and design. Rotational or pivotal movements are not required.

Such movements may be provided in cases where a determination of the position of only one workpiece holder disc is performed with respect to all of the workpiece holder discs 30, 31, 32. In the above described method the workpiece holder discs 30, 31, 32 are subsequently moved into a predetermined position, in particular angular position to be loaded or unloaded. If the workpiece holder discs are in a predetermined angular relationship to each other, a determination of the position and angular position of only one disc is sufficient to determine the position and angular position of the other disc. A suitable robot-like mechanism may be used to remove or deposit workpieces from or into the workpiece holder discs.

The loading and unloading device shown in FIG. 2 may be arranged so that its head 45 is movable not only to one workpiece holder disc but also to an adjacent workpiece holder disc. Preferably this is achieved by having the direction of movement of head 45 to extend through the centers of a pair of adjacent workpiece holder discs 30, 31 or 32. The loading and unloading operation is then as follows. It is assumed that workpiece holder disc 32 is in a precise loading position and does not contain any workpieces. Head 45 has received workpieces from an area outside of the honing machine so that the workpieces are precisely aligned to recesses 34 in disc 32 when head 45 is above disc 32. The workpieces now may be precisely deposited into recesses 34.

Thereafter head 45 is moved e.g. to workpiece holder disc 32 which still contains workpieces. The gripping and holding means of head 45 are acting in planes, which means that it is not necessary to provide for a predetermined orientation of the workpieces to be picked up from head 45. The exact position of workpiece holder disc 31 is known. When head 45 has reached this position, the workpieces may be removed from the recesses and thereafter deposited outside of the honing machine. As a result thereof drive motor 25a is activated so that workpiece holder disc 31 is moved on until it has reached the precise loading position at which workpiece holder disc 32 was previously. The workpiece holder disc when in this loading position receives workpieces, and thereafter the workpieces are removed from the adjacent workpiece holder disc. Such a method minimizes the duration of the loading and unloading of workpieces even though the loading and unloading device is of an extremely simple structure. Head 45 merely needs to be displaceable and alignable along a single axis.

I claim:

1. Honing, lapping or polishing machine comprising:
   upper and lower working discs, at least one of said discs having an abrasive means for honing, lapping, or polishing the surface of a workpiece;
   an outer gear member including an annular row of teeth;
   a centrally arranged inner gear member including an annular row of teeth;
   a plurality of workpiece holder discs disposed between said working discs and including recesses for receiving workpieces, said discs including teeth at their outer peripheries in driving engagement with the teeth of the outer and inner gear members in a planetary gear type fashion;
   the number of teeth of the outer gear member being an integral multiple of the number of teeth on each workpiece holder disc;
   loading and unloading means for loading and unloading workpieces into and from the workpiece holder discs;
   drive means for rotating said inner gear member to drive said workpiece holder discs in an orbital path, said drive means including a drive motor, a brake means, and a control circuit for controlling operation of said drive motor and brake means, the control circuit including means for providing a stop signal to deactivate said drive motor and activate said brake means; and
   position detecting means for detecting when one of the workpiece holder discs is in a predetermined stop position, the detecting means including a first position detector for detecting when one of the discs reaches a first predetermined position in said path, a second position detector, and positioning means responsive to detection by said first position detector of the arrival of one of said discs at said first position for reciprocally moving said second position detector between a retracted, rest position and an extended, sensing position in the path of the discs, said second position detector in said sensing position comprising means for detecting when said one of the workpiece holder discs reaches said predetermined stop position subsequent to said first position to provide a position signal to said control circuit for producing said stop signal when said one of the discs reaches said predetermined stop position relative to said position detector.

2. The machine as claimed in claim 1, wherein said position detector in said extended position comprises means for co-operating with a predetermined region on the rim of the next disc to arrive at that position to produce said position signal.

3. The machine as claimed in claim 1, wherein the number of the teeth of each of the inner and outer gear members is an integral multiple of the number of workpiece holder discs.

4. The machine as claimed in claim 1, wherein said drive means includes means for operating said drive motor in a slow motion mode, and said position detecting means is responsive to said drive motor being operated in said slow motion ode to move said position detector into said sensing position.

5. Machine as claimed in claim 1 wherein the positioning means comprises means for displacing the position detector into said sensing position when the drive motor has been deactivated and it is operating in a slow motion mode.

6. Machine as claimed in claim 1 wherein said position sensors are mounted to said outer gear member.

7. Machine as claimed in claim 1 wherein the teeth on said workpiece holder discs have outer head portions at the rim of said discs and said position sensor or sensors are arranged to cooperate with the head portions of the teeth of the workpiece holder discs.

8. Machine as claimed in claim 7 wherein one tooth of the workpiece holder discs is of a special geometrical shape or has a specially shaped surface and includes an element serving as an initiator and is made from a material or is of a material structure different from that of the rest of the workpiece holder discs.

9. Machine as claimed in claim 1 further including aligning means disposed adjacent the orbital path of the workpiece holder discs for aligning the workpiece holder discs preferably in radial directions, in partial when they have attained said predetermined stop position.

10. Machine as claimed in claim 9, characterized in that the aligning means are arranged to engage the outer peripheries of the toothing of the workpiece holder discs.

11. A method of positioning one of a series of workpiece holding discs of a honing, lapping or polishing machine in a predetermined loading and unloading position relative to loading and unloading device, the method comprising the steps of:
    driving a series of equally spaced workpiece holder discs in an orbital path;
    detecting when one of the workpiece holder discs reaches a first predetermined position in said path;
    displacing a position detector from a retracted rest position outside of the orbital path of the workpiece holder discs into an extended sensing position in the path of the discs in response to detection of the arrival of one of said discs at said first position;
    detecting when said one of the workpiece holder discs reaches a second predetermined position relative to the position detector subsequent to said first position, said second predetermined relative position corresponding to a predetermined loading and unloading position of at least one of said workpiece holder discs relative to a loading and unloading device;

providing a stop signal to stop the workpiece holder discs when said second predetermined relative position is reached.

12. The method as claimed in claim 11, wherein said step of detecting one of said workpiece holder discs comprises sensing when a predetermined position on the rim of the disc cooperates with the position detector in said extended position.

13. The method as claimed in claim 11, including of: when said second predetermined position of said first disc is reached.

14. The method as claimed in claim 11, including driving said discs in a slow motion mode when said first position is reached until said second predetermined position is reached.

15. Honing, lapping or polishing machine comprising: upper and lower working discs, at least one of said discs having an abrasive means for honing, lapping or polishing the surface of a workpiece;

an outer gear member including an annular row of teeth;

a centrally arranged inner gear member including an annular row of teeth;

a plurality of workpiece holder discs disposed between said working discs and including recesses for receiving workpieces, said discs including teeth at their outer peripheries in driving engagement with the teeth of the outer and inner gear members in a planetary gear type fashion;

the number of teeth of the outer gear member being an integral multiple of the number of teeth on each workpiece holder disc;

loading and unloading means for loading and unloading workpieces into and from the workpiece holder discs;

drive means for rotating said inner gear member to drive said workpiece holder discs in an orbital path, said drive means including a drive motor, a brake means, and a control circuit for controlling operation of said drive motor and brake mans, the control circuit including means for providing a stop signal to deactivate said drive motor and activate said brake means;

a first position detector for providing an activating signal when one of the workpiece holder discs reaches a first predetermined position in said path; and a second position detector responsive to said activating signal for providing a position signal when said one of the workpiece holder discs is in a predetermined stop position, said stop position being subsequent to said first predetermined position, said control circuit being responsive to said position signal to provide said stop signal, and said second position detector being arranged to cooperate with the rim of each disc.

16. The machine as claimed in claim 15, wherein the teeth of each workpiece holder disc have outer head portions corresponding to the rim of said disc, and said second position detector comprises means for cooperating with the head portion of one of the teeth on each disc.

* * * * *

UNITED STATES PATENT AND TRADEMARK OFFICE
CERTIFICATE OF CORRECTION

PATENT NO. : 4,916,868
DATED : April 17, 1990
INVENTOR(S) : Gerhard Wittstock

It is certified that error appears in the above-identified patent and that said Letters Patent is hereby corrected as shown below:

Column 8, claim 4, line 16 "ode" should be --mode--;

Column 8, claim 9, line 39, "partial" should be

--particular--;

Column 10, claim 15, line 11 "mans" should be --means--;

Signed and Sealed this

Eighth Day of October, 1991

Attest:

HARRY F. MANBECK, JR.

*Attesting Officer*      *Commissioner of Patents and Trademarks*